United States Patent
Hamilton, Jr. et al.

(10) Patent No.: US 6,697,107 B1
(45) Date of Patent: Feb. 24, 2004

(54) SMOOTHING A DIGITAL COLOR IMAGE USING LUMINANCE VALUES

(75) Inventors: John F. Hamilton, Jr., Rochester, NY (US); James E. Adams, Jr., Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/112,554

(22) Filed: Jul. 9, 1998

(51) Int. Cl.$^7$ .......................... H04N 9/68; H04N 5/208; H04N 5/21; G06K 9/40
(52) U.S. Cl. ...................... 348/234; 348/252; 348/631; 382/264; 382/266
(58) Field of Search ................................ 348/235, 624, 348/631, 252, 253, 272, 273, 234; 382/300, 264, 254, 260

(56) References Cited

U.S. PATENT DOCUMENTS

| | | | |
|---|---|---|---|
| 5,142,592 A | * 8/1992 | Moler | 382/22 |
| 5,506,619 A | * 4/1996 | Adams, Jr. et al. | 348/266 |
| 5,596,367 A | * 1/1997 | Hamilton, Jr. et al. | 348/272 |
| 5,631,703 A |   5/1997 | Hamilton, Jr. et al. | |
| 5,633,678 A | * 5/1997 | Parulski et al. | 348/232 |
| 5,652,621 A | * 7/1997 | Adams, Jr. et al. | 348/272 |
| 5,990,950 A | * 11/1999 | Addison | 348/273 |
| 6,091,862 A | * 7/2000 | Okisu | 282/300 |
| 6,125,201 A | * 9/2000 | Zador | 382/166 |
| 6,185,320 B1 | * 2/2001 | Bick et al. | 382/260 |
| 6,192,162 B1 | * 2/2001 | Hamilton, Jr. et al. | 382/266 |
| 6,195,459 B1 | * 2/2001 | Zhu | 382/176 |
| 6,208,763 B1 | * 3/2001 | Avinash | 382/254 |
| 6,249,616 B1 | * 6/2001 | Hashimoto | 382/284 |

* cited by examiner

Primary Examiner—Wendy R. Garber
Assistant Examiner—Lin Ye
(74) Attorney, Agent, or Firm—Raymond L. Owens

(57) ABSTRACT

A method for smoothing a digital color image having color pixels in which each colored pixel is expressed as one luminance and two chrominance color values, including computing parameters for at least two orientations for each pixel in the stored digital image; using the computed parameters to form a classifier value for each such orientation and using such classifiers to determine the pixel classification based on such classifiers; and smoothing pixel chroma values according to the determined pixel classification.

10 Claims, 6 Drawing Sheets

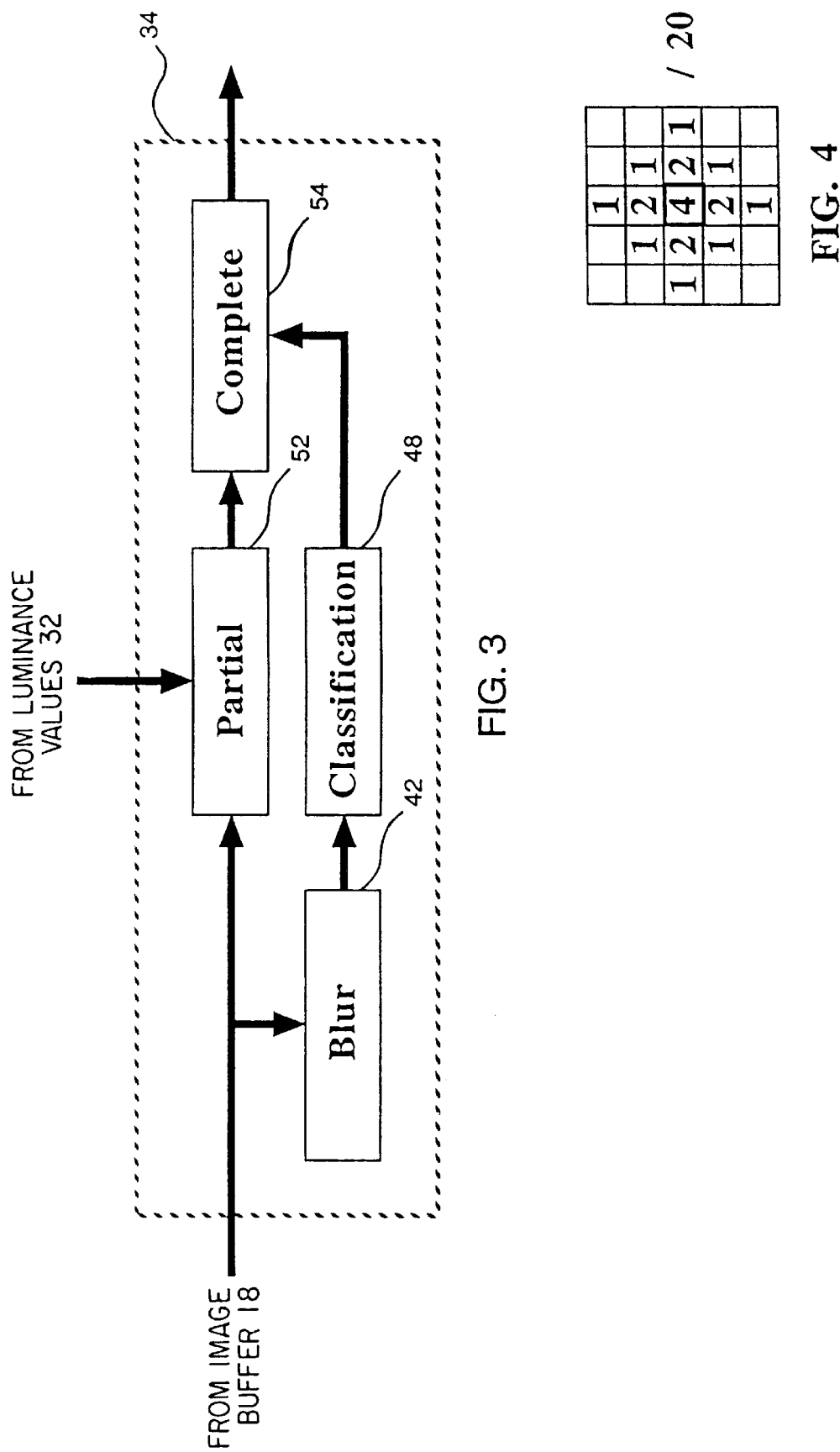

SMOOTHING A DIGITAL COLOR IMAGE USING LUMINANCE VALUES

CROSS REFERENCE TO RELATED APPLICATIONS

Reference is made to commonly assigned U.S. patent application Ser. No. 09/096,632, filed Jun. 12, 1998, entitled "Computing Color Specification (Luminance and Chrominance) Values for Images" to John F. Hamilton, Jr. et al., the disclosure of which is incorporated herein by reference.

FIELD OF THE INVENTION

This invention relates to digital color image processing and, more particularly, to smoothing the digital color image.

BACKGROUND OF THE INVENTION

With the advent of digital cameras, it is becoming more and more advantageous to capture images as colored digital images. Colored digital images are frequently stored in three color planes such as red, green, and blue, or cyan, magenta, and yellow. In image processing, these colored digital images luminance and chrominance color coordinates are quite useful because they express color in a similar fashion to the way the human visual system operates. As is well known, luminance, the black and white portion of an image, determines the sharpness of such image while the chrominance values determines its colorfulness.

As also is well known to those skilled in the art, generally three channels are used to describe a color. For example, if an image is recorded having red, green, and blue channels, this can be converted to one luminance channel and two chrominance channels such as Y, Cr, Cb. These luminance and two chrominance channels facilitate certain aspects of digital image processing. Color interpolation between pixels can reduce the noise level in the luminance channel, but not without the expense of increasing noise in the chrominance channel. If this noise if left untreated, artifacts can appear in an output image which often are characterized by being splotchy in appearance.

This splotchy color problem can be reduced by smoothing the chrominance channels. Because the chrominance content of the images is usually of low spatial frequency and the noise content is of high spatial frequency, the application of a low-pass blur filter has been found to reduce noise levels without significantly reducing image quality. However, the higher the noise level, the more aggressive the smoothing or blurring should be.

A problem with chrominance smoothing occurs at the edges in a digital image. If the blurring is aggressive (passing lower frequencies) and the colors near the edge are bold (have high chroma), the blurring will cause the colors to "bleed" across the edge. In this situation, the image around the edge is easily seen by a viewer to be unnatural.

SUMMARY OF THE INVENTION

It is an object of the present invention to provide an effective way of smoothing digital color images which minimizes the problem of color bleeding across image edges discussed above.

This object is achieved by a method for smoothing a digital color image having color pixels in which each colored pixel is expressed as one luminance and two chrominance color values, such method comprising the steps of:

a) computing parameters for at least two orientations for each pixel in the stored digital image;

b) using the computed parameters to form a classifier value for each such orientation and using such classifiers to determine the pixel classification based on such classifiers; and c) smoothing pixel chroma values according to the determined pixel classification.

ADVANTAGES

An advantage of the present invention is the recognition that chroma values can be corrected in accordance with the present invention to provide highly effective smoothing of digital color image.

Another advantage of the present invention is that it greatly reduced color bleeding across edges. The method can be readily implemented and assigns each pixel to one of five classes which are used in color smoothing. This invention readily lends itself to digital image processing.

BRIEF DESCRIPTION OF THE DRAWINGS

FIG. 3 shows a detailed block diagram of the chrominance values block 34 shown in FIG. 2;

FIG. 4 depicts a kernel used in computing low frequency luminance values;

DETAILED DESCRIPTION OF THE INVENTION

Single-sensor electronic cameras employing color filter arrays are well known. Elements not specifically shown or described herein may be selected from those known in the art.

Figure 1:
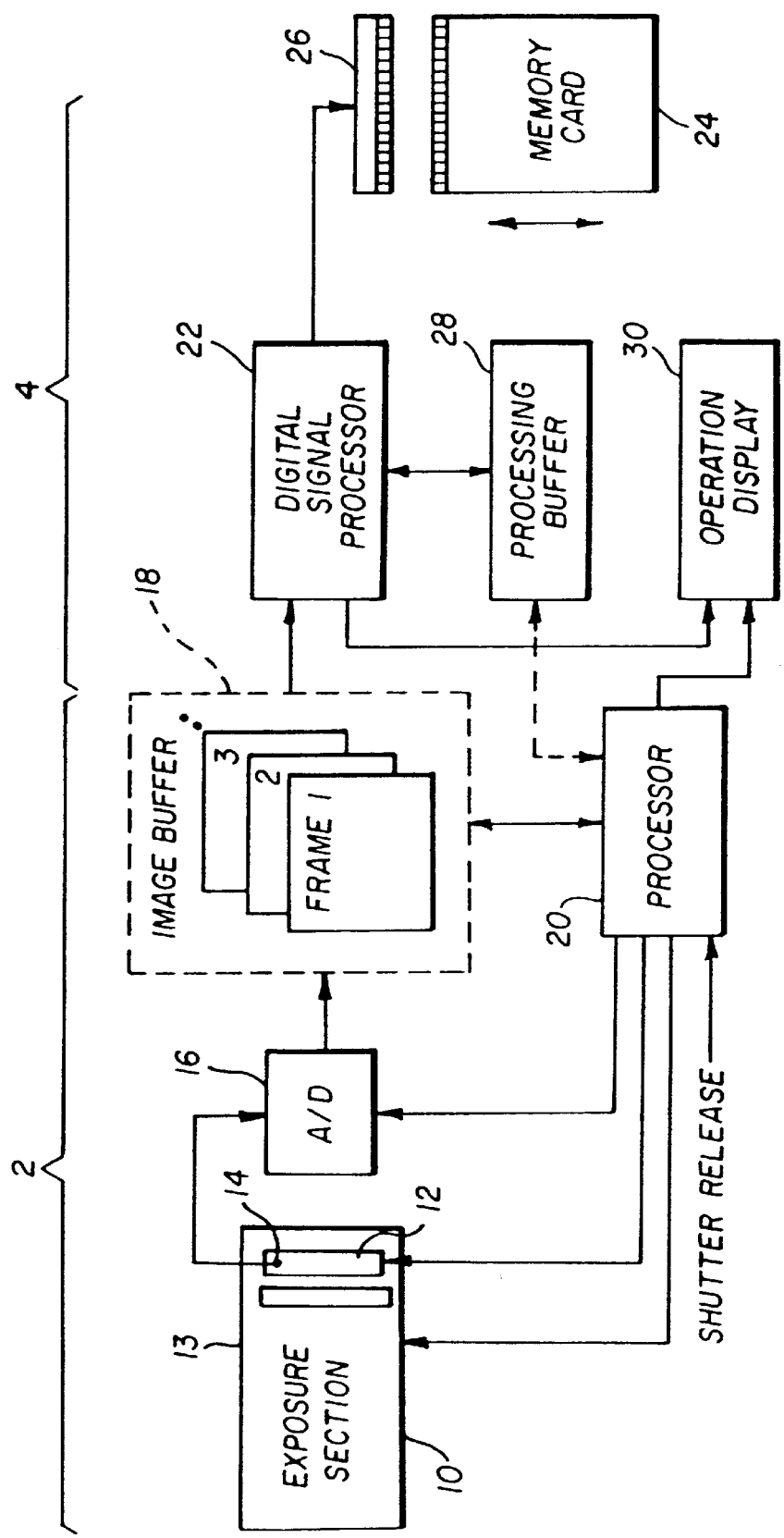
FIG. 1 is a block diagram of an electronic still camera employing interpolation processing according to the invention.
Figure 2:
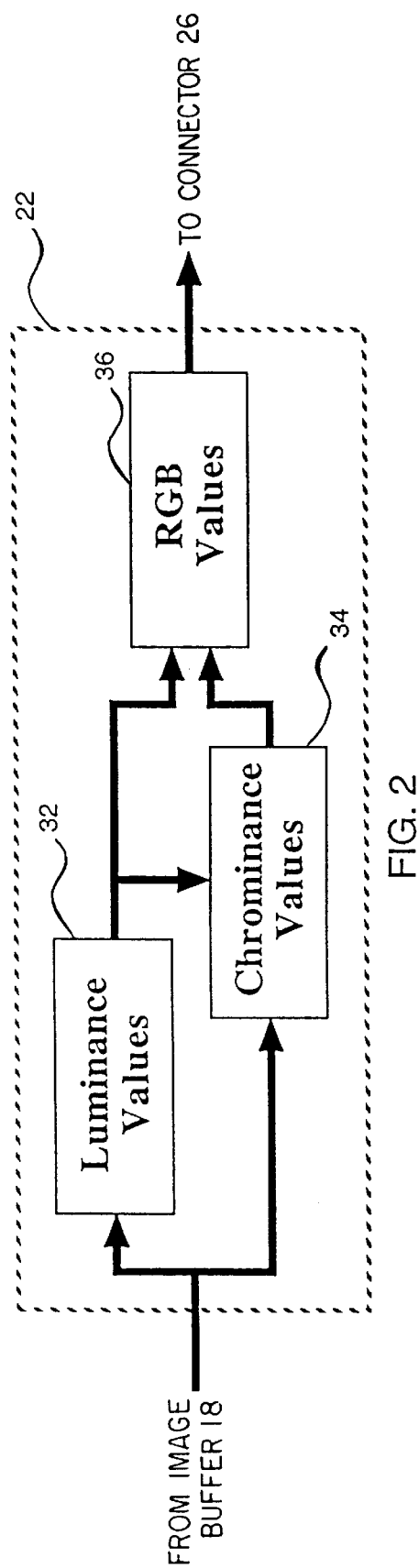
FIG. 2 is a block diagram of the logic of the interpolation processing technique for producing luminance in accordance with the invention.
Figure 5C:
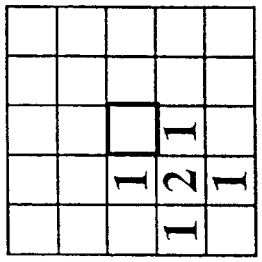
FIGS. 5A–C depict pixel weights used in computing a classifier in the classification block 48 shown in FIGS. 3A and 3B.
Figure 6C:
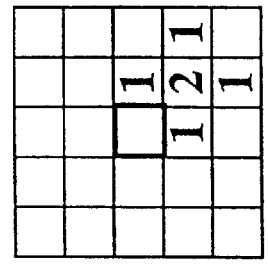
FIGS. 6A–C also depict pixel weights used in computing another classifier produced by the classification block 48.
Figure 5B:
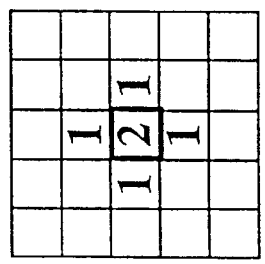
Figure 6B:
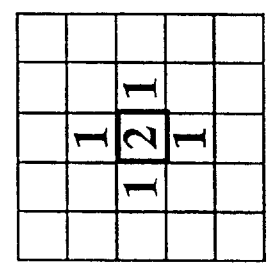
Figure 5A:
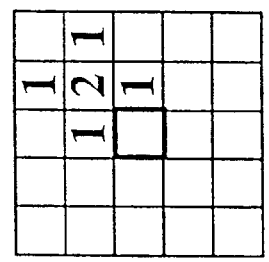
Figure 6A:
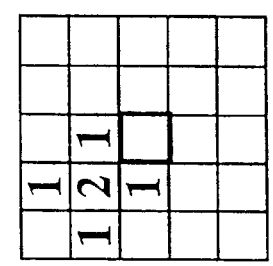

Referring initially to FIGS. 1 and 2, an electronic still camera 1 is divided generally into an input section 2 and an interpolation and recording section 4. The input section 2 includes an exposure section 10 for directing image light from a subject (not shown) toward an image sensor 12. Although not shown, the exposure section 10 includes conventional optics for directing the image light through a diaphragm, which regulates the optical aperture, and a shutter, which regulates exposure time. The image sensor 12, which includes a two-dimensional array of colored photosites or pixels corresponding to picture elements of the image, can be a conventional charge-coupled device (CCD) using either well-known interline transfer or frame transfer techniques. The image sensor 12 is covered by a color filter array (CFA) 13. For an example of a color filter array which is particularly suitable for use in the present invention reference is made to commonly-assigned U.S. Pat. No. 5,631,703 to Hamilton et al, the disclosure of which is incorporated by reference. The image sensor 12 is exposed to image light so that analog image charge information is generated in respective photosites. The charge information is applied to an output diode 14, which converts the charge information to analog image signals corresponding to respective picture elements. The analog image signals are applied to an A/D converter 16, which generates a digital image value from the analog input signal for each picture element. The digital values are applied to an image buffer 18, which may be a random access memory (RAM) with storage capacity for a plurality of still images.

A control processor 20 generally controls the input section 2 of the electronic still camera 1 by initiating and controlling exposure ((by operation by the diaphragm and shutter (not shown) in the exposure section 10)), by generating the horizontal and vertical clocks needed for driving the image sensor 12 and for clocking image information therefrom, and by enabling the A/D converter 16 in conjunction with the image buffer 18 for each value segment relating to a picture element. The control processor 20 typically includes a microprocessor and appropriate memory coupled to a system timing circuit. Once a certain number of digital image values have been accumulated in the image buffer 18, the stored values are applied to a digital signal processor 22, which controls the throughput processing rate for the interpolation and recording section 4 of the electronic still camera 1. The digital signal processor 22 applies an interpolation algorithm to the digital image values, and sends the interpolated values to a conventional, removable memory card 24 via a connector 26. Although an electronic still camera 1 has been described as including a digital signal processor, it will be understood that the digital signal processor 22 does not have to be an integral part of the electronic still camera 1. A requirement of this invention is that the digital image values are provided from an image sensor.

Since the interpolation and related processing ordinarily occurs over several steps, the intermediate products of the processing algorithm are stored in a processing buffer 28. The processing buffer 28 may also be configured as part of the memory space of the image buffer 18. The number of image values needed in the image buffer 18 before digital processing can begin depends on the type of processing, that is, for a neighborhood interpolation to begin, a block of values including at least a portion of the image values comprising a video frame must be available. Consequently, in most circumstances, the interpolation may commence as soon as the requisite block of picture elements is present in the buffer 18.

The input section 2 operates at a rate commensurate with normal operation of the electronic still camera 1 while interpolation, which may consume more time, can be relatively divorced from the input rate. The exposure section 10 exposes the image sensor 12 to image light for a time period dependent upon exposure requirements, for example, a time period between 1/1000 second and several seconds. The image charge is then swept from the photosites in the image sensor 12, converted to a digital format, and written into the image buffer 18. The driving signals provided by the control processor 20 to the image sensor 12, the A/D converter 16 and the buffer 18 are accordingly generated to achieve such a transfer. The processing throughput rate of the interpolation and recording section 4 is determined by the speed of the digital signal processor 22.

One desirable consequence of this architecture is that the processing algorithm employed in the interpolation and recording section may be selected for quality treatment of the image rather than for throughput speed. This, of course, can put a delay between consecutive pictures which may affect the user, depending on the time between photographic events. This is a problem since it is well known and understood in the field of electronic imaging that a digital still camera should provide a continuous shooting capability for a successive sequence of images. For this reason, the image buffer 18 shown in FIG. 1 provides for storage of a plurality of images, in effect allowing a series of images to "stack up" at video rates. The size of the buffer is established to hold enough consecutive images to cover most picture-taking situations.

An operation display panel 30 is connected to the control processor for displaying information useful in operation of the electronic still camera 1. Such information might include typical photographic data, such as shutter speed, aperture, exposure bias, color balance (auto, tungsten, fluorescent, daylight), field/frame, low battery, low light, exposure modes (aperture preferred, shutter preferred), and so on. Moreover, other information unique to this type of electronic still camera 1 is displayed. For instance, the removable memory card 24 would ordinarily include a directory signifying the beginning and ending of each stored image. This would show on the display panel 30 as either (or both) the number of images stored or the number of image spaces remaining, or estimated to be remaining.

The digital signal processor 22 interpolates each still video image stored in the image buffer 18 according to the interpolation technique shown in FIG. 2. The interpolation of missing data values at each pixel location follows the sequence shown in FIG. 2, as will later be discussed.

In the implementation shown in FIG. 2, the digital signal processor 22 provides an adaptive interpolation technique to provide a compute luminance function shown as luminance values block 32 for computing luminance values as will be described hereinafter in connection with FIG. 3. After the luminance values are computed then a chrominance values block 34 computes the chrominance values of each pixel based upon the computed final luminance values. Finally an RGB values block 36 computes the image in Red(R), Green(G), Blue(B) format which are used for an image display or for making a hard copy output. Although this disclosure is in reference to computing red, green, and blue values, it will be understood that it is also applicable to other color spaces such as cyan, magenta, and yellow. Another color space that can be used is to use luminance and chrominance values which are typically referred to as YCC color spaces. The Y refers to luminance and the two C's refer to chrominance. Luminance values are computed as shown in FIG. 2 in the digital signal processor of FIG. 1 as is well known in the art. For a more complete description of the computation of such luminance values, reference can be made to commonly assigned U.S. patent application Ser. No. 09/096,632, filed Jun. 12, 1998, entitled "Computing Color Specification (Luminance and Chrominance) Values for Images" to John F. Hamilton, Jr. et al.

Turning now to FIG. 3, the chrominance values block 34 is shown in more detail. Beginning with the details of blur block 42, reference is made to FIG. 4 where a 5x5 blur kernel arrangement is shown. For any given pixel which is selected as the center pixel of a 5x5 kernel it is assigned value weight of 4. Pixels which surround the kernel of interest are also assigned different values. These values shown in FIG. 4 are representative and those skilled in the art will appreciate that other values can be selected which will also provide an appropriate blur function. Note that once the weighted sum is computed is divided by 20, which is the sum of all the weights in the blur kernel. The following equations depict how these kernel values are used to compute each pixel in a digital image which has high frequency components removed.

If the recorded CFA color values are:

$$
\begin{array}{ccccc}
A_{11} & A_{12} & A_{13} & A_{14} & A_{15} \\
A_{21} & A_{22} & A_{23} & A_{24} & A_{25} \\
A_{31} & A_{32} & A_{33} & A_{34} & A_{35} \\
A_{41} & A_{42} & A_{43} & A_{44} & A_{45} \\
A_{51} & A_{52} & A_{53} & A_{54} & A_{55}
\end{array}
$$

then the following equations show how the blur kernel values of FIG. 4 are used to produce the blurred luminance value $B_{33}$ for the center pixel above.

$$B_{33} = (1*A_{13} + 1*A_{22} + 2*A_{23} + 1*A_{24} + 1*A_{31} + 2*A_{32} + 4*A_{33} + 2*A_{34} + 1*A_{35} + 1*A_{42} + 2*A_{43} + 1*A_{44} + 1*A_{53})/20$$

The output of blur block 42 is applied to classification block 48. The computation provided by classification block 48 will now be described.

If the blurred luminance values are:

$$
\begin{array}{ccccc}
B_{11} & B_{12} & B_{13} & B_{14} & B_{15} \\
B_{21} & B_{22} & B_{23} & B_{24} & B_{25} \\
B_{31} & B_{32} & B_{33} & B_{34} & B_{25} \\
B_{41} & B_{42} & B_{43} & B_{44} & B_{45} \\
B_{51} & B_{52} & B_{53} & B_{54} & B_{55}
\end{array}
$$

then the following equations show how the horizontal (horz) and vertical (vert) classifiers are computed for the center pixel.

$$\text{horz} = \text{Abs}(u-w) + \text{Abs}(u-2*v+w)$$

where the term (u−w) is a gradient value,
the term (u−2*v+w) is a Laplacian second-order value,
u=$B_{31}$,
v=$B_{33}$,
w=$B_{35}$.

$$\text{vert} = \text{Abs}(u-w) + \text{Abs}(u-2*v+w)$$

where u=$B_{13}$,
v=$B_{33}$,
w=$B_{53}$.

The two diagonal orientations will be named diag1 and diag2 and correspond to a diagonal line of slope 1 (connecting lower left to upper right) and a diagonal line of slope −1 (connecting upper left to lower right) respectively. The classifiers for diag1 and diag2 are computed using the kernel values shown in FIGS. 5A–5C and FIGS. 6A–6C respectively. The classifier equations using said kernel values are as follows:

$$\text{diag1} = (\text{Abs}(u-w) + \text{Abs}(u-2*v+w))/3$$

where $$u = (1*B_{14} + 1*B_{23} + 2*B_{24} + 1*B_{25} + 1*B_{34})$$
$$v = (1*B_{23} + 1*B_{32} + 2*B_{33} + 1*B_{34} + 1*B_{43})$$
$$w = (1*B_{32} + 1*B_{41} + 2*B_{42} + 1*B_{43} + 1*B_{52})$$

and $$\text{diag2} = (\text{Abs}(u-w) + \text{Abs}(u-2*v+w))/3$$

where $$u = (1*B_{12} + 1*B_{21} + 2*B_{22} + 1*B_{23} + 1*B_{32})$$
$$v = (1*B_{23} + 1*B_{32} + 2*B_{33} + 1*B_{34} + 1*B_{43})$$
$$w = (1*B_{34} + 1*B_{43} + 2*B_{44} + 1*B_{45} + 1*B_{54})$$

Figure 7A:
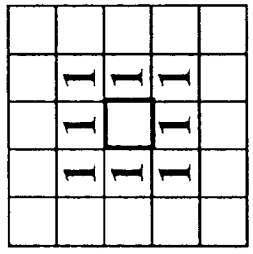
FIGS. 7A–7E respectively show the kernel weights for smoothing (i.e. blurring) chrominance for pixels which have been classified as horizontal, vertical, flat, diag1, and diag2.
Figure 7B:
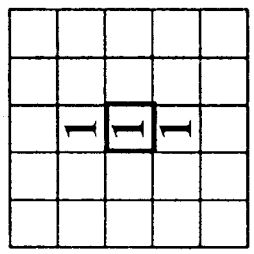
Figure 7C:
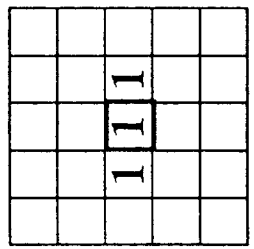
Figure 7D:
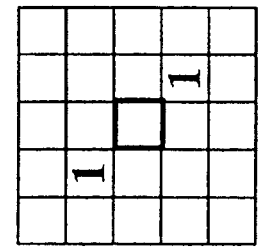
Figure 7E:
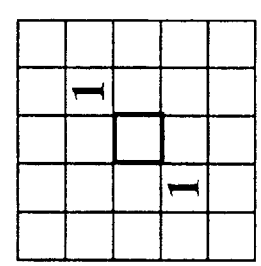
Figure 8A:
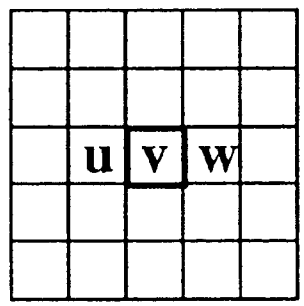
FIGS. 8A–D respectively show horizontal, vertical, diag1, and diag2 orientations when no CFA data are available.
Figure 8B:
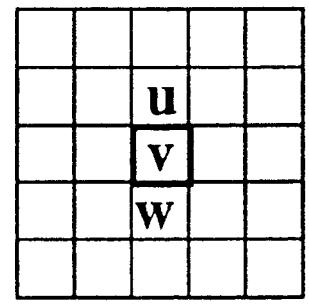
Figure 8C:
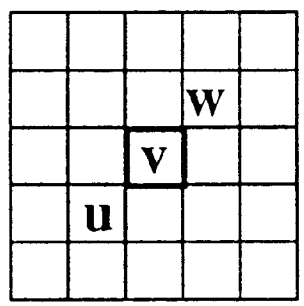
Figure 8D:
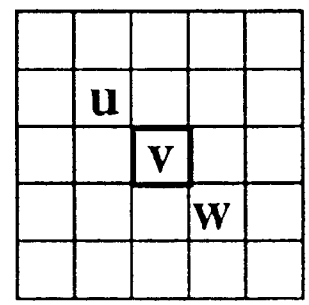

If a pixel's horizontal and vertical classifier are both less than a fixed threshold, such as 24, the pixel is classified as "flat" and the flat chrominance blur kernel is used (see FIG. 7C). Otherwise, a pixel's classification is determined by the smallest classifier which indicates the preferred orientation of interpolation such as horizontal, vertical, diag1, or diag2.

Initial chrominance values for the image are computed in partial block 52 and passed to complete block 54, where they are smoothed according to the selected pixel classification.

The chrominance blur kernels for the preferred orientations horizontal, vertical, diag1, and diag2 are shown in FIGS. 7A, 7B, 7D, and 7E, respectively. For a specific example, suppose the classifier values for horizontal, vertical, diag1, and diag2 were 32, 20, 18, and 25, respectively. Because the horizontal classifier 32 exceeds the threshold of 24, the pixel is not classified as "flat." So then the minimum value 18 being the diag1 classifier determines that the preferred direction for chrominance smoothing is diag1. Using the chrominance blur kernel weights for the diag1 orientation (FIG. 7D), the smoothed chrominance value C33 would be:

$$C_{33} = (A_{24} + A_{42})/2$$

The present invention can also be applied to images for which no CFA data is available. In this situation, the method of chrominance smoothing is the same except that the low-frequency luminance data used to classify each pixel comes from image luminance data rather than from original CFA data. The lower the noise content in the image luminance data, the lower the degree of luminance blurring required for robust pixel classification.

In the simplest case, the pixel classifiers would still be computed as before:

$$\text{Abs}(u-w) + \text{Abs}(u-2v+w)$$

But, the values for u, v, and w would be single nearby luminance values as shown in FIGS. 8A–D, respectively, for the horizontal, vertical, diag1, and diag2 orientations. Stated differently, the values u, v, and w are not weights in this case but are the actual luminance values. The pixel of interest is shown for convenience as the central pixel and these views show the relative location, with respect to the central pixel, of the values u, v, and w.

The present invention can be embodied in a computer program stored on a computer readable product such as, for example, magnetic storage media, such as a magnetic disk (for example, a floppy disk), magnetic tape, optical disks, optical tape, or machine readable memory.

The invention has been described in detail with particular reference to certain preferred embodiments thereof, but it will be understood that variations and modifications can be effected within the spirit and scope of the invention.

PARTS LIST

- 2 input section
- 4 recording section
- 10 exposure section
- 12 image sensor
- 13 color filter array
- 14 output diode
- 16 A/D converter
- 18 image buffer
- 20 control processor
- 22 digital signal processor
- 24 removable memory card
- 26 connector
- 28 processing buffer
- 30 display panel
- 32 luminance values block
- 34 chrominance values block
- 36 RGB values
- 42 blur block
- 48 classification block
- 52 partial block
- 54 complete block

What is claimed is:

1. A method for smoothing a digital color image having color pixels in which each colored pixel is expressed as one luminance (Y) and two chrominance (Cr,Cb) color values, such method comprising:

computing parameters for at least two orientations for each existing pixel in the stored digital image where each colored pixel is expressed as the one luminance (Y) and two chrominance (Cr,Cb) color values;

using the computed parameters to form a classifier value for each such orientation and using such classifiers to determine the pixel classification based on such classifiers; and smoothing the pixel chrominance (Cr,Cb) color values of each existing pixel according to the determined pixel classification.

2. A method for smoothing a digital color image having color pixels in which each colored pixel is expressed as one luminance (Y) and two chrominance (Cr,Cb) color values, such method comprising:

determining a luminance gradient and Laplacian for each of at least two orientations for each existing pixel in the stored digital image where each pixel is expressed as the one luminance (Y) and two chrominance (Cr,Cb) color values;

combining the gradient and Laplacian to form a classifier value for each such orientation and using such classifiers to determine the pixel classification based on such classifiers; and smoothing the pixel chrominance (Cr,Cb) color values of each existing pixel according to the determined pixel classification.

3. The method of claim 2 wherein there are four classifiers each having a value associated with each pixel which are horizontal, vertical, slope 1 diagonal, and slope −1 diagonal.

4. The method of claim 2 further including comparing the horizontal and vertical classifiers to determine if they are less than a predetermined threshold and, if so, classifying the pixel as having a flat orientation, but when above such threshold, classifying according to the smallest classifier value and using such selected orientation to perform smoothing.

5. The method of claim 2 wherein the pixel classification is a function only of neighboring luminance pixel values.

6. An apparatus for processing a digital color image having color pixels in which each colored pixel is expressed as one luminance (Y) and two chrominance (Cr,Cb) color values, such apparatus comprising:

means for storing the pixels of the digital color image where each pixel is expressed as the one luminance (Y) and two chrominance (Cr,Cb) color values; and processor means operatively associated with the storage means and responsive to the stored luminance values for obtaining Laplacian second-order and gradient values in at least two image orientations including:

means for combining the Laplacian second-order and the gradient values to define a classifier for each image orientation at each existing image pixel to determine a preferred orientation for smoothing from the set of classifier values at each pixel; and means responsive to the determined preferred orientation for smoothing both the stored chrominance (Cr,Cb) color values for each existing corresponding image pixel.

7. The apparatus of claim 6 wherein there are four classifiers each having a value associated with each pixel which are horizontal, vertical, slope 1 diagonal, and slope −1 diagonal.

8. The apparatus of claim 6 further including comparing the horizontal and vertical classifiers to determine if they are less than a predetermined threshold and, if so, classifying the pixel as having a flat orientation, but when above such threshold, classifying according to the smallest classifier value and using such selected orientation to perform smoothing.

9. The apparatus of claim 6 wherein the pixel classification is a function only of neighboring luminance pixel values.

10. A computer program product for processing a stored digital color image having color pixels in which each colored pixel is expressed as one luminance (Y) and two chrominance (Cr,Cb) color values, comprising:

a computer readable storage medium including programming means, processor means operatively associated with storage storing the pixels of the digital color image where each pixel is expressed as the one luminance (Y) and two chrominance (Cr,Cb) color values and responsive to the stored luminance values for obtaining Laplacian second-order and gradient values in at least two image orientations including:

means for combining the Laplacian second-order and the gradient values to define a classifier for each image orientation at each existing image pixel to determine a preferred orientation for smoothing from the set of classifier values at each pixel; and means responsive to the determined preferred orientation for smoothing and the stored chrominance values for smoothing both chrominance color values for each existing corresponding image pixel.

\* \* \* \* \*